March 5, 1968

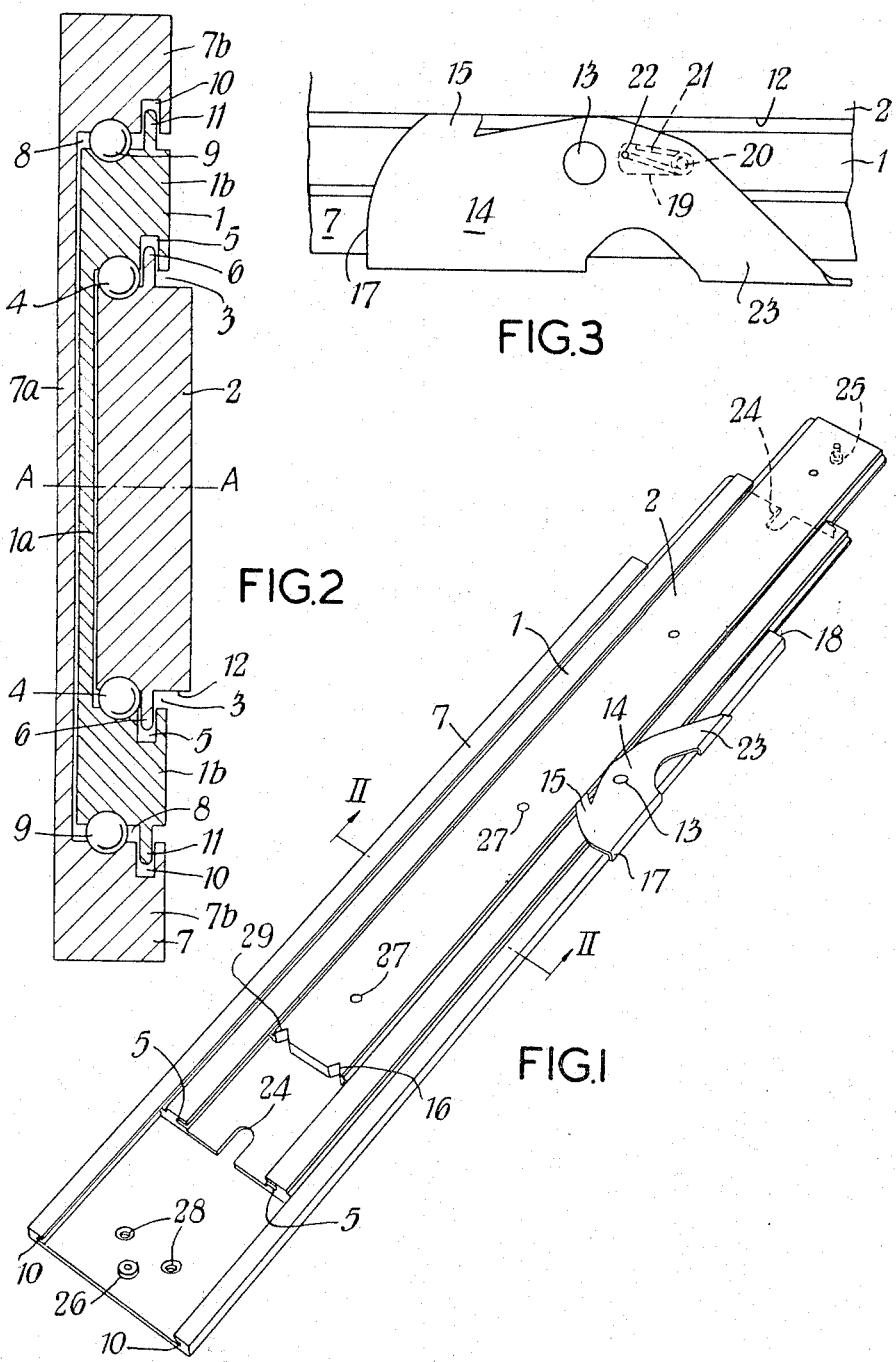

G. A. LOAKE 3,371,968

EXTENSION SLIDE

Filed March 19, 1965

Inventor
George Albert Loake
By Cushman, Darby & Cushman
Attorneys

United States Patent Office 3,371,968
Patented Mar. 5, 1968

3,371,968
EXTENSION SLIDE
George Albert Loake, Walton-on-Thames, England, assignor to Southborough Group Limited, a British company
Filed Mar. 19, 1965, Ser. No. 441,083
Claims priority, application Great Britain, Mar. 24, 1964, 12,494/64
2 Claims. (Cl. 308—3.6)

ABSTRACT OF THE DISCLOSURE

An extension slide for a filing cabinet drawer has three slide members mounted one inside another by ball, or plain nylon, bearings arranged in lateral gaps between the slide members and protected externally by tongue-and-groove seals, the intermediate and outermost slide members being channel-shaped. A releasable latching member co-operating with a lateral guiding surface of the innermost slide member is pivoted on the intermediate member and can engage behind one end of each of the innermost and outermost members to lock the slide in its fully extended condition.

---

According to the present invention there is provided an extension slide, comprising a channel-shaped first slide member, a second slide member extending along said first slide member and slidable therein, portions of said second slide member at opposite longitudinal sides of said second slide member, together with portions of said first slide member, defining gaps between said first slide member and said second slide member at respective opposite sides of said second slide member, bearings located in said gaps and serving to guide sliding of said second slide member in said first slide member, portions of one of the first and second slide members defining grooves therein extending longitudinally thereof and opening into said gaps outwardly of said bearings, and tongues provided on the other of said first and second slide members, projecting across said gaps into said grooves and covering said bearings for protecting said bearings against foreign matter.

The present slide can be used in a filing cabinet to enable a drawer to be moved into and out of the cabinet.

Figure 5:
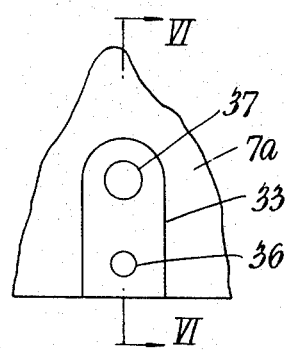
Figure 6:
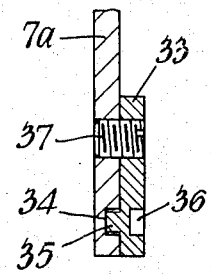
Figure 4:
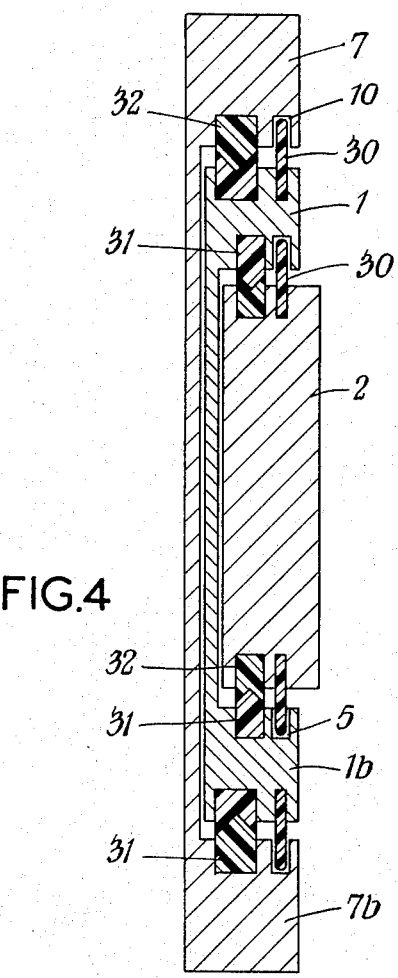

In order that the invention may be clearly understood and readily carried into effect, reference will now be made, by way of example, to the accompanying drawings, in which:

FIGURE 1 is a perspective view of a double extension slide for a drawer of a cabinet, FIGURE 2 is a section taken on the line II—II of FIGURE 1, FIGURE 3 is a plan view of a detail of FIGURE 1, FIGURE 4 is a view similar to FIGURE 2 of a modified version of the slide, FIGURE 5 is a plan view of a modification of a detail of FIGURE 1, FIGURE 6 is a section taken on the line VI—VI of FIGURE 5.

Referring to FIGURES 1 to 3, the slide includes a channel-shaped first slide member 1 and a second slide member 2 extending along the first slide member 1 and slidable therein between a fully extended position, in which it projects out of one end of the member 1, and a non-extended position. The slide member 2 is shown in an intermediate position in FIGURE 1. At opposite longitudinal sides of the member 2, and between the members 1 and 2, are two gaps 3 in which are located ball-bearings 4 serving to guide the sliding of the member 2 in the member 1. The member 1 consists of a base part 1a and two side parts 1b. Formed in the inside faces of the two side parts 1b are respective grooves 5 extending longitudinally of the member 1 and opening into the gaps 3 at locations outwardly of the ball-bearings 4. Two tongues 6 integral with the member 2 and disposed at opposite longitudinal sides thereof project across the gaps 3 into the respective grooves 5, and thus cover the ball-bearings 4 to protect the bearings against foreign matter such as dust. The tongues 6 also serve to prevent the balls from jumping out of the races of the bearings 4 should the slide be subjected to a sudden jar. The slide also includes a channel-shaped third slide member 7 which receives the member 1 and the mouth of the channel of which opens in the same direction as does the mouth of the channel of the slide member 1. Gaps 8 are provided between the members 1 and 7 at opposite longitudinal sides of the member 1. Located in the gaps 8 are other ball-bearings 9 which serve to guide sliding of the member 1 in the member 7. The member 7 consists of a base part 7a and two side parts 7b. Formed in the inside surfaces of the side parts 7b are respective grooves 10 which extend the length of the side parts 7b and open into the gaps 8 outwardly of the bearings 9. Tongues 11 formed integral with the member 1 at respective opposite longitudinal sides thereof project across the gaps 8 into the respective grooves 10, thereby to cover the bearings 9 to protect the bearings 9 against foreign matter. The tongues 6 and 11 are clearance fits in the grooves 5 and 10. Grease can be packed into the clearances at the bases of the grooves so that the bearings 4 and 9 are self-lubricating. Formed on the member 2 is a laterally facing guide surface 12 projecting out of the mouth of the channel of the member 1 and extending the length of the member 2. A pivot pin 13 pivotally mounts a releasable, sheet-metal, latching member 14 on the member 1, and has its axis extending in the direction in which opens the mouths of the channels of the members 1 and 2. The latching member 14 has a hooked portion 15 which normally bears slidingly against the surface 12, but which is movable, by pivoting of the latching member 14 when the members 1 and 2 are fully extended, into the intended path of movement of the member 2. A notch 16 is formed in that end surface of the member 2 which is innermost when the member 2 is fully extended. The notch 16 extends the full thickness of the member 2, and therefore projects out of the mouth of the channel of the member 1, and can thus co-operate with the hooked portion 15 when the members 1 and 2 are fully extended. The member 14 is provided with a nose 17 which is movable, with movement of the hooked portion 15 into the intended path of the member 2, to latch behind an end abutment face 18 of the member 7. Provided in the member 1 beneath the member 14 is a hollow 19 in which is disposed a torsion spring 20 of which one end 21 bears against a side wall of the hollow 19, and of which the other end 22 is fixed to the latching member 14. The spring 20 thus continually urges the latching member 14 clockwise in FIGURE 3, so that the hooked portion 15 normally bears slidingly against the guide surface 12, but, when the members 1 and 2 are fully extended, the hooked portion 15 engages in the notch 16 and the nose 17 latches behind the face 18, so that the members 1 and 2 are latched in their fully extended positions. The latching member 14 has a projecting portion 23 which extends along the slide away from the nose 17 and which can be used by an operator to pivot the member 14 anti-clockwise in FIGURE 3 so as to release the member 14 to permit return of the slides 1 and 2 to their non-extended positions. The portion 23 is so arranged that it protrudes from the cabinet when the slides 1 and 2 are in their fully extended positions, so that the operator does not need to put his hand inside the cabinet to release the latching member. The base part 1a is formed in its respective opposite end faces with recesses 24 which each extend the full thickness of the base part 1a. The recess 24 at the outer end of the slide 1 co-operates with a stop member 25 fixed at a single location to the outer end of the slide member 2. The stop member 25 serves to abut against the base wall of the associated recess 24 to limit return travel of the member 2 relatively to the member 1 from the fully extended position of the member 2. The inner recess 24 similarly co-operates with a stop member 26 fixed to the base member 7a, thereby to limit return travel of the member 1 relatively to the member 7 from the fully extended position of the member 1. The stops serving to limit outward travel of the members 1 and 2 are not shown in the drawings, but can be of any well-known kind. Holes 27 are provided in the member 2 for attachment of the member 2 to a cabinet or drawer of the cabinet, whilst holes 28 are provided in the base part 7a for attachment of the member 7 to the drawer or cabinet, as the case may be. Apart from the latching device shown in FIGURE 3, the slide is symmetrical about central longitudinal plane A—A in FIGURE 2, even to the extent that a notch 29 is provided symmetrically with the notch 16. This permits a latching member to be mounted on the member 1 at either side of the slide during manufacture, the side chosen depending on the intended position of the slide in the cabinet.

In the version shown in FIGURE 4, the tongues 6 and 11 integral with the members 2 and 1 are replaced by nylon strips 30 fixed in slots in the members 1 and 2 and sliding in the grooves 5 and 10. Moreover, the ball-bearings 4 and 9 are replaced by nylon plain bearings consisting of male nylon inserts 31 fixed in slots in inside surfaces of the side parts 1b and 7b, and female nylon inserts 32 fixed in slots formed in surfaces of the members 1 and 2 facing those inside surfaces.

In the modification shown in FIGURE 5, instead of a stop member 26 fixed at a single location to the base part 7a, there is provided a stop member 33 fixed to the base part 7a at two locations spaced apart from the slide. At one location, there is an indentation 34 in the base part 7a in which indentation engages a cylindrical projection 35 formed by punching an indentation 36 into the stop member 33. At the other location, a threaded bore in the base part 7a registers with a threaded bore in the member 33, and into the bores is screwed a stud 37 riveted in position.

I claim:

1. An extension slide, comprising a first slide member, portions of said first slide member defining a channel therein extending therealong, a second slide member extending along said first slide member and slidable therein, portions of said second slide member at opposite longitudinal sides of said second slide member, together with portions of said first slide member, defining gaps between said first slide member and said second slide member at respective opposite sides of said second slide member, bearings located in said gaps and serving to guide sliding of said second slide member in said first slide member, portions of one of the first and second slide members defining grooves therein extending longitudinally thereof and opening into said gaps outwardly of said bearings, tongues provided on the other of said first and second slide members, projecting across said gaps into said grooves and covering said bearings for protecting said bearings against foreign matter, a third slide member, portions of said third slide member defining a channel therealong of which the mouth opens in the same direction as does the mouth of the channel of said first slide member, and which receives said first slide member, portions of said first slide member at opposite longitudinal sides of said first slide member, together with portions of said third slide member, defining other gaps between said first slide member and said third slide member at respective opposite sides of said first slide member, other bearings located in said other gaps and serving to guide sliding of said first slide member in said third slide member, portions of one of the first and third slide members defining other grooves therein extending therealong and opening into said other gaps outwardly of said other bearings, other tongues provided on the other of said first and third slide members, projecting across said other gaps into said other grooves and covering said other bearings for protecting said other bearings against foreign matter, portions of said second slide member defining an outwardly facing guide surface projecting out of the mouth of the channel of said first slide member and extending the length of said second slide member, a releasable latching member, pivot means having its axis extending in said direction and mounting said latching member on said first slide member, an engaging portion of said latching member movable, by pivoting of said latching member, into the intended path of movement of said second slide member but normally bearing slidingly against said guide surfaces, a co-operating end portion of said second slide member projecting out of the mouth of the channel of the first slide member and serving to co-operate with said engaging portion when the first and second slide members are fully extended, an end abutment portion of said third slide member, a nose of said latching member movable, with movement of said engaging portion into said intended path, into the path of movement of said end abutment portion, and means urging said latching member to pivot such that said engaging portion normally bears against said guide surface, but, when the first and second slide members are fully extended, said nose moves into the path of movement of said end abutment portion and said engaging portion co-operates with said co-operating end portion to latch said first and second slide members in their fully extended positions.

2. An extension slide, comprising a first slide member, portions of said first slide member defining a channel therein extending therealong, a second slide member extending along said first slide member and slidable therein, portions of said second slide member at opposite longitudinal sides of said second slide member, together with portions of said first slide member, defining gaps between said first slide member and said second slide member at respective opposite sides of said second slide member, bearings located in said gaps and serving to guide sliding of said second slide member in said first slide member, portions of one of the first and second slide members defining grooves therein extending longitudinally thereof and opening into said gaps outwardly of said bearings, tongues provided on the other of said first and second slide members, projecting across said gaps into said grooves and covering said bearings for protecting said bearings against foreign matter, a third slide member, portions of said third slide member defining a channel therealong of which the mouth opens in the same direction as does the mouth of the channel of said first slide member, and which receives said first slide member, portions of said first slide member at opposite longitudinal sides of said first slide member, together with portions of said third slide member, defining other gaps between said first slide member and said third slide member at respective opposite sides of said first slide member, other bearings located in said other gaps and serving to guide sliding of said first slide member in said third slide member, portions of one of the first and third slide members defining other grooves therein extending therealong and opening into said other gaps outwardly of said other bearings, other tongues provided on the other of said first and third slide members, projecting across said other gaps into said other grooves and covering said other bearings for protecting said other bearings against foreign matter, portions of said second slide member defining an outwardly facing guide surface projecting out of the mouth of the channel of said first slide member and extending the length of said second slide member, a releasable latching member, pivot means having its axis extending in said direction and mounting said latching member on said first slide member, a hooked portion of said latching member movable, by pivoting of said latching member, into the intended path of movement of said second slide member but normally bearing slidingly against said guide surface, end portions of said second slide member defining a notch projecting out of the mouth of the channel of the first slide member and serving to co-operate with said hooked portion when the first and second slide members are fully extended, an end abutment portion of said third slide member, a nose of said latching member movable, with movement of said hooked portion into said intended path, into the path of movement of said end abutment portion, and means urging said latching member to pivot such that said hooked portion normally bears against said guide surface, but, when the first and second slide members are fully extended, said nose moves into the path of movement of said end abutment portion and said hooked portion engages in said notch to latch said first and second slide members in their fully extended positions.

References Cited

UNITED STATES PATENTS

| | | | |
|---|---|---|---|
| 1,071,006 | 8/1913 | Little | 308—3.6 |
| 1,938,908 | 12/1933 | Hunter | 312—339 |
| 2,011,192 | 8/1935 | Comstock | 308—187.2 |
| 2,031,251 | 2/1936 | Clark | 312—337 |
| 2,692,802 | 10/1954 | Kurtzon | 308—3.8 |
| 2,739,027 | 3/1956 | Gussock | 312—333 |
| 2,794,690 | 6/1957 | Bullock | 312—337 |
| 2,801,887 | 8/1957 | Gussock | 308—3.8 |
| 2,815,253 | 12/1957 | Baker | 308—3.6 |
| 2,844,430 | 7/1958 | Bogar | 308—3.6 |
| 2,857,764 | 10/1958 | Frank | 308—2 X |
| 2,862,772 | 12/1958 | Gussock | 308—3.8 |
| 3,025,114 | 3/1962 | Beecher | 308—183 |
| 3,035,873 | 5/1962 | Fall | 308—3.8 |
| 3,059,986 | 10/1962 | Miller | 308—3.6 |
| 3,074,766 | 1/1963 | Meyer | 308—187.2 |
| 3,140,129 | 7/1964 | Koss | 308—3.8 |
| 3,258,299 | 6/1966 | Meyer | 308—3.8 |

MARTIN P. SCHWADRON, *Primary Examiner.*

L. L. JOHNSON, *Assistant Examiner.*